US011942831B2

(12) United States Patent
Metivier et al.

(10) Patent No.: US 11,942,831 B2
(45) Date of Patent: Mar. 26, 2024

(54) THREE-PHASE BLDC MOTOR DRIVER/CONTROLLER HAVING DIAGNOSTIC SIGNAL PROCESSING

(71) Applicant: Allegro MicroSystems, LLC, Manchester, NH (US)

(72) Inventors: Ryan J. Metivier, Merrimack, NH (US); Daniel Jacques, Jefferson, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 521 days.

(21) Appl. No.: 16/935,656

(22) Filed: Jul. 22, 2020

(65) Prior Publication Data

US 2021/0218317 A1 Jul. 15, 2021

Related U.S. Application Data

(60) Provisional application No. 62/961,346, filed on Jan. 15, 2020.

(51) Int. Cl.
*G01R 31/44* (2020.01)
*H02K 11/215* (2016.01)
(Continued)

(52) U.S. Cl.
CPC ........... *H02K 11/215* (2016.01); *H02K 11/26* (2016.01); *H02K 11/33* (2016.01); *H02P 6/16* (2013.01)

(58) Field of Classification Search
CPC ...... G01R 31/44; H02K 11/215; H02K 11/26; H02K 11/33; H02P 6/16
See application file for complete search history.

(56) References Cited

U.S. PATENT DOCUMENTS 6,002,338 A 12/1999 Pavlov et al.
6,111,437 A 8/2000 Patel
(Continued)

FOREIGN PATENT DOCUMENTS

DE 196 34 714 B4 3/1998
DE 196 50 935 A1 6/1998
(Continued)

OTHER PUBLICATIONS

U.S. Appl. No. 15/982,268, filed May 17, 2018, Lim et al.
(Continued)

*Primary Examiner* — Cortez M Cook
(74) *Attorney, Agent, or Firm* — DALY, CROWLEY, MOFFORD & DURKEE, LLP

(57) ABSTRACT

Method and apparatus for providing a motor controller/driver integrated circuit package having diagnostic processing of signal(s) from a magnetic field sensor positioned in relation to a motor. The sensor signal may have a first voltage range corresponding to a valid high state and a second voltage range corresponding to a valid low state. A diagnostic module can process the received signal from the magnetic field sensor to determine whether the received signal has a voltage level within the first or second voltage ranges. An output module may generate an output signal having a state based on the whether the received signal has a voltage level within the first or second voltage ranges.

20 Claims, 10 Drawing Sheets

(51) Int. Cl.
*H02K 11/26* (2016.01)
*H02K 11/33* (2016.01)
*H02P 6/16* (2016.01)

(56) References Cited

U.S. PATENT DOCUMENTS

| | | |
|---|---|---|
| 6,288,567 B1 | 9/2001 | Fink |
| 6,542,847 B1 | 4/2003 | Lohberg et al. |
| 6,687,644 B1 | 2/2004 | Zinke et al. |
| 6,815,944 B2 | 11/2004 | Vig et al. |
| 6,968,484 B2 | 11/2005 | Hummel |
| 7,026,808 B2 | 4/2006 | Vig et al. |
| 7,319,418 B2 | 1/2008 | Fink |
| 8,084,969 B2 | 12/2011 | David et al. |
| 8,577,634 B2 | 11/2013 | Donovan et al. |
| 8,624,588 B2 | 1/2014 | Vig et al. |
| 8,754,640 B2 | 6/2014 | Vig et al. |
| 8,860,404 B2 | 10/2014 | Dwyer et al. |
| 8,994,369 B2 | 3/2015 | Vig et al. |
| 9,068,859 B2 | 6/2015 | Dwyer et al. |
| 9,151,771 B2 | 10/2015 | Vig et al. |
| 9,172,565 B2 | 10/2015 | Cadugan et al. |
| 9,203,339 B2 | 12/2015 | Sato |
| 9,214,884 B2 | 12/2015 | Sonoda et al. |
| 9,222,990 B2 | 12/2015 | Dwyer et al. |
| 9,300,235 B2 | 3/2016 | Ng et al. |
| 9,496,708 B2 | 11/2016 | Chappell et al. |
| 9,621,140 B1 | 4/2017 | Fernandez et al. |
| 9,634,715 B2 | 4/2017 | Scheinkerman et al. |
| 9,664,748 B2 | 5/2017 | Friedrich et al. |
| 9,787,495 B2 | 10/2017 | Vreeland et al. |
| 9,929,683 B2 | 3/2018 | Sonoda et al. |
| 10,101,410 B2 | 10/2018 | Latham et al. |
| 10,216,559 B2 | 2/2019 | Fernandez |
| 10,326,389 B2 | 6/2019 | Lu et al. |
| 10,734,443 B2 | 8/2020 | Lassalle-Balier et al. |
| 10,746,814 B2 | 8/2020 | Rubinsztain et al. |
| 10,753,989 B2 | 8/2020 | Campiglio et al. |
| 2002/0021144 A1 | 2/2002 | Morgan et al. |
| 2003/0141862 A1 | 7/2003 | Vig et al. |
| 2005/0144546 A1 | 6/2005 | Igeta et al. |
| 2006/0156075 A1 | 7/2006 | Mitsuishi |
| 2009/0075607 A1 | 3/2009 | Khoury |
| 2010/0026279 A1 | 2/2010 | Vig et al. |
| 2010/0211347 A1 | 8/2010 | Friedrich et al. |
| 2012/0007680 A1 | 1/2012 | Hijikata et al. |
| 2013/0335069 A1 | 12/2013 | Vig et al. |
| 2013/0335074 A1 | 12/2013 | Dwyer et al. |
| 2014/0208151 A1 | 7/2014 | Fernandez |
| 2014/0237298 A1 | 8/2014 | Pe'Er |
| 2015/0185279 A1 | 7/2015 | Milano et al. |
| 2015/0249385 A1 | 9/2015 | Takahashi |
| 2015/0269018 A1 | 9/2015 | Ellis |
| 2016/0025820 A1 | 1/2016 | Scheller et al. |
| 2016/0097692 A1 | 4/2016 | Hirai et al. |
| 2016/0123780 A1 | 5/2016 | Snyder et al. |
| 2016/0139230 A1 | 5/2016 | Petrie et al. |
| 2017/0092024 A1 | 3/2017 | Slama et al. |
| 2017/0219662 A1 | 8/2017 | Prentice et al. |
| 2018/0129196 A1 | 5/2018 | Hainz et al. |
| 2018/0136999 A1* | 5/2018 | Fernandez ............ G01R 31/44 |
| 2018/0275823 A1 | 9/2018 | Lim |
| 2018/0367073 A1* | 12/2018 | Haas .................... B62D 5/0487 |
| 2019/0346294 A1 | 11/2019 | Coceani et al. |
| 2020/0021212 A1 | 1/2020 | Yamada et al. |
| 2020/0025837 A1 | 1/2020 | Rubinsztain et al. |
| 2020/0028456 A1 | 1/2020 | Morioka et al. |
| 2020/0309866 A1 | 10/2020 | Rubinsztain et al. |

FOREIGN PATENT DOCUMENTS

| | | |
|---|---|---|
| DE | 199 00 774 A1 | 7/2000 |
| EP | 0944888 A2 | 9/1999 |
| WO | WO 98/25148 A2 | 6/1998 |
| WO | WO 2010/150416 A1 | 12/2010 |

OTHER PUBLICATIONS

U.S. Appl. No. 15/655,403, filed Jul. 20, 2017, Doogue et al.
U.S. Appl. No. 15/655,400, filed Jul. 20, 2017, Doogue et al.
U.S. Appl. No. 15/655,390, filed Jul. 20, 2017, Pepka et al.
U.S. Appl. No. 15/655,383, filed Jul. 20, 2017, Kerdraon et al.
U.S. Appl. No. 15/655,377, filed Jul. 20, 2017, Kerdraon et al.
U.S. Appl. No. 62/337,478, filed May 17, 2016, Burdette et al.
Office Action dated Apr. 19, 2018 for U.S. Appl. No. 15/350,400; 18 pages.
Response to Office Action filed on May 9, 2018 2018 for U.S. Appl. No. 15/350,400; 18 pages.
Final Office Action dated Aug. 6, 2018 for U.S. Appl. No. 15/350,400; 24 pages.
Response to Final Office Action filed on Nov. 5, 2018 2018 for U.S. Appl. No. 15/350,400; 18 pages.
Notice of Allowance dated Nov. 21, 2018 for U.S. Appl. No. 15/350,400; 7 pages.
PCT International Search Report and Written Opinion dated Mar. 8, 2018 for International Application No. PCT/US2017/059148; 16 pages.
PCT International Preliminary Report dated May 23, 2019 for Intl. Pat. Appl. No. PCT/US2017/059148; 9 pages.
European 161/162 Communication dated Jun. 6, 2019 for European Application No. 17809079.1; 3 Pages.
Response to Office Action filed on Dec. 16, 2019 for European Application No. 17809079.1; 28 pages.
Korean Office Action (with Machine English Translation from Espacenet.com) dated Aug. 28, 2020 for Korean Application No. 10-2019-7013456; 15 Pages.
Response (with Machine English Translation from Espacenet.com) to Korean Office Action dated Aug. 28, 2020 for Korean Application No. 10-2019-7013456; Response filed Oct. 28, 2020; 102 Pages.
Korean Office Action (with Machine English Translation from Espacenet.com) dated Nov. 6, 2020 for Korean Application No. 10-2019-7013456; 6 Pages.
Extended European Search Report dated Dec. 12, 2019 for European Application No. 19185340.7; 7 pages.
Response (with Amended Claims & Specification) to European Official Communication dated Jan. 27, 2020 and to Search Opinion dated Dec. 12, 2019 for European Application No. 19185340.7; Response filed Jul. 22, 2020; 24 Pages.
Office Action dated Apr. 2, 2020 for U.S. Appl. No. 16/040,716; 20 pages.
Response to Office Action filed on Apr. 23, 2020 for U.S. Appl. No. 16/040,716; 14 pages.
Notice of Allowance dated May 6, 2020 for U.S. Appl. No. 16/040,716; 10 pages.
Allegro MicroSystems, LLC, "Three-Wire Hall-Effect Latch with Advanced Diagnostics;" APS12450 Data Sheet, Rev. 1; Apr. 23, 2019; 23 Pages.
U.S. Non-Final Office Action dated Jul. 22, 2020 for U.S. Appl. No. 16/901,103; 20 Pages.
Response to U.S. Non-Final Office Action dated Jul. 22, 2020 for U.S. Appl. No. 16/901,103; Response filed Aug. 13, 2020; 11 Pages.
U.S. Notice of Allowance dated Nov. 23, 2020 for U.S. Appl. No. 16/901, 103; 11 Pages.
Intention to Grant dated Oct. 1, 2021 for European Application No. 19185340.7, 5 pages.
U.S. Appl. No. 16/396,877, filed Apr. 29, 2019, Lu.
U.S. Appl. No. 16/787,326, filed Feb. 11, 2020, Metivier et al.
European Examination Report dated Mar. 18, 2021 for European Application No. 19185340.7, 5 Pages.
European response to Communication filed on Apr. 26, 2021 for European Application No. 19185340.7; 16 pages.

* cited by examiner

US 11,942,831 B2

THREE-PHASE BLDC MOTOR DRIVER/CONTROLLER HAVING DIAGNOSTIC SIGNAL PROCESSING

CROSS REFERENCE TO RELATED APPLICATIONS

The present application claims the benefit of U.S. Provisional Patent Application No. 62/961,346, filed on Jan. 15, 2020, which is incorporated herein by reference.

BACKGROUND

In motor control applications, magnetic field sensing elements, such as Hall sensors, are commonly used to sense the magnetic field of the motor and provide motor position feedback. Conventional motor controllers generate signals for energizing each phase of the motor. For example, pulse width modulation (PWM) can be used to control gate drivers that provide signals to the motor phases. Known motor controllers may have limited diagnostic processing capabilities.

SUMMARY

The present invention provides method and apparatus for a motor driver/controller having a diagnostic module to process one or more signals from one or more magnetic field sensors positioned in relation to a motor. The signal(s) may have a voltage range for a valid high signal and/or a voltage range for a valid low signal. The signals from the sensors can be processed to identify faults, various states, and the like.

In one aspect, a method comprises: receiving, at a motor controller/driver, a signal from a magnetic field sensor positioned in relation to a motor, wherein the signal has a first voltage range corresponding to a valid high state and a second voltage range corresponding to a valid low state; processing the received signal from the magnetic field sensor to determine whether the received signal has a voltage level within the first or second voltage ranges; and generating an output signal having a state based on the whether the received signal has a voltage level within the first or second voltage ranges.

In another aspect, a motor controller/driver integrated circuit package comprises: an input to receive a signal from a magnetic field sensor positioned in relation to a motor, wherein the signal has a first voltage range corresponding to a valid high state and a second voltage range corresponding to a valid low state; a diagnostic module configured to process the received signal from the magnetic field sensor to determine whether the received signal has a voltage level within the first or second voltage ranges; and an output module to generate an output signal having a state based on the whether the received signal has a voltage level within the first or second voltage ranges.

BRIEF DESCRIPTION OF THE DRAWINGS

The foregoing features of this invention, as well as the invention itself, may be more fully understood from the following description of the drawings in which.

DETAILED DESCRIPTION

Figure 1:
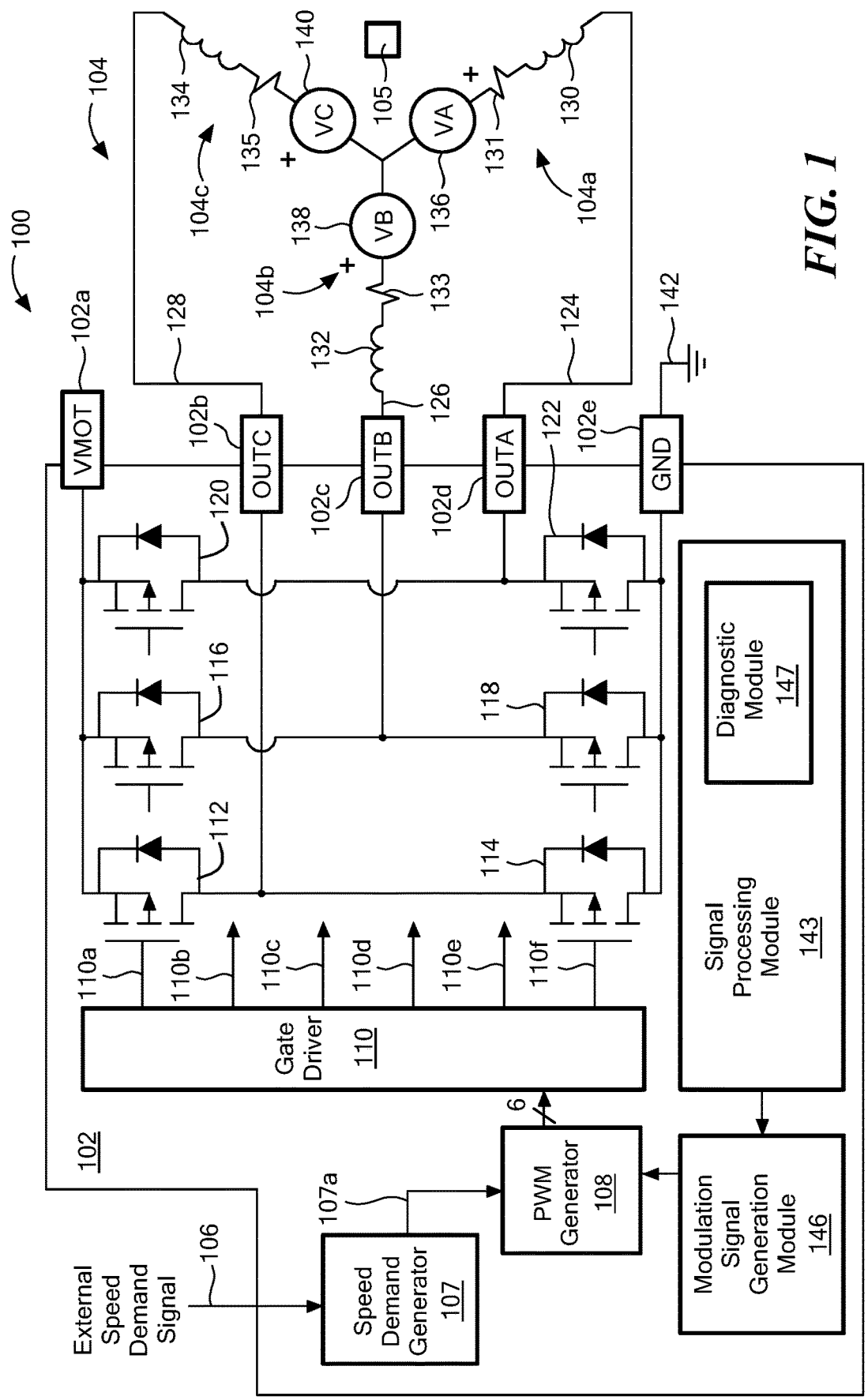
FIG. 1 is a schematic representation of a motor controller having diagnostic signal processing.

FIG. 1 shows an example motor controller 100 having a motor control circuit 102 coupled to an electric motor 104 for providing enhanced diagnostic processing in accordance with example embodiments of the invention. In embodiments, signals from one or more magnetic field sensing devices 105 are provided to a diagnostic module 147 for processing, as described more fully below. The magnetic field sensing devices 105 can include at least one magnetic field sensing element, such as a Hall element, positioned in relation to phases of the motor for generating diagnostic signals for the diagnostic module 147.

The motor 104 is shown to include three windings 104a, 104b, 104c, which can be depicted as a respective equivalent circuit having an inductor in series with a resistor and in series with a back EMF (BEMF) voltage source. For example, the winding A 104a is shown to include an inductor 130 in series with a resistor 131 and in series with a back EMF voltage source VA 136.

The motor control circuit 102 includes a speed demand generator 107 coupled to receive an external speed demand signal 106 from outside of the motor control circuit 102. The external speed demand signal 106 can be in one of a variety of formats. In general, the external speed demand signal 106 is indicative of a speed of the motor 104 that is requested from outside of the motor control circuit 102.

The speed demand generator 107 is configured to generate a speed demand signal 107a. A pulse width modulation (PWM) generator 108 is coupled to receive the speed demand signal 107a and configured to generate PWM signals having a duty cycle that is controlled by the speed demand signal 107a. The PWM generator 108 is also coupled to receive modulation waveforms from a modulation signal generation module 146. The PWM signals are generated with a modulation characteristic (i.e., a relative time-varying duty cycle) in accordance with the modulation waveforms.

The motor control circuit 102 also includes a gate driver circuit 110 coupled to receive the PWM signals and configured to generate PWM gate drive signals 110a, 110b, 110c, 110d, 110e, 110f to drive six transistors 112, 114, 116, 118, 120, 122 arranged as three half-bridge circuits 112/114, 116/118, 120/122. The six transistors 112, 114, 116, 118, 120, 122 operate in saturation to provide three motor drive signals VoutA, VoutB, VoutC, 124, 126, 128, respectively, at nodes 102d, 102c, 102b, respectively. It is understood that any suitable configuration of switching elements can be used to provide the motor drive signals. The motor control circuit 102 can also include a signal processing module 143 and diagnostic module 147 receiving feedback from the magnetic field sensors 105.

The signal processing module 143 is configured to generate a position reference signal indicative of a rotational reference position of the motor 104. The modulation signal generation module 146 is coupled to receive the position reference signal and configured to change a phase of the modulation waveforms provided to the PWM generator 108.

The motor control circuit 102 can be coupled to receive a motor voltage VMOT, or simply VM, at a node 102a, which is supplied to the motor through the transistors 112, 116, 120 during times when the upper transistors 112, 116, 120 are turned on. It will be understood that there can be a small voltage drop (for example, 0.1 volts) through the transistors 112, 116, 120 when they are turned on and supplying current to the motor 104.

Figure 2:
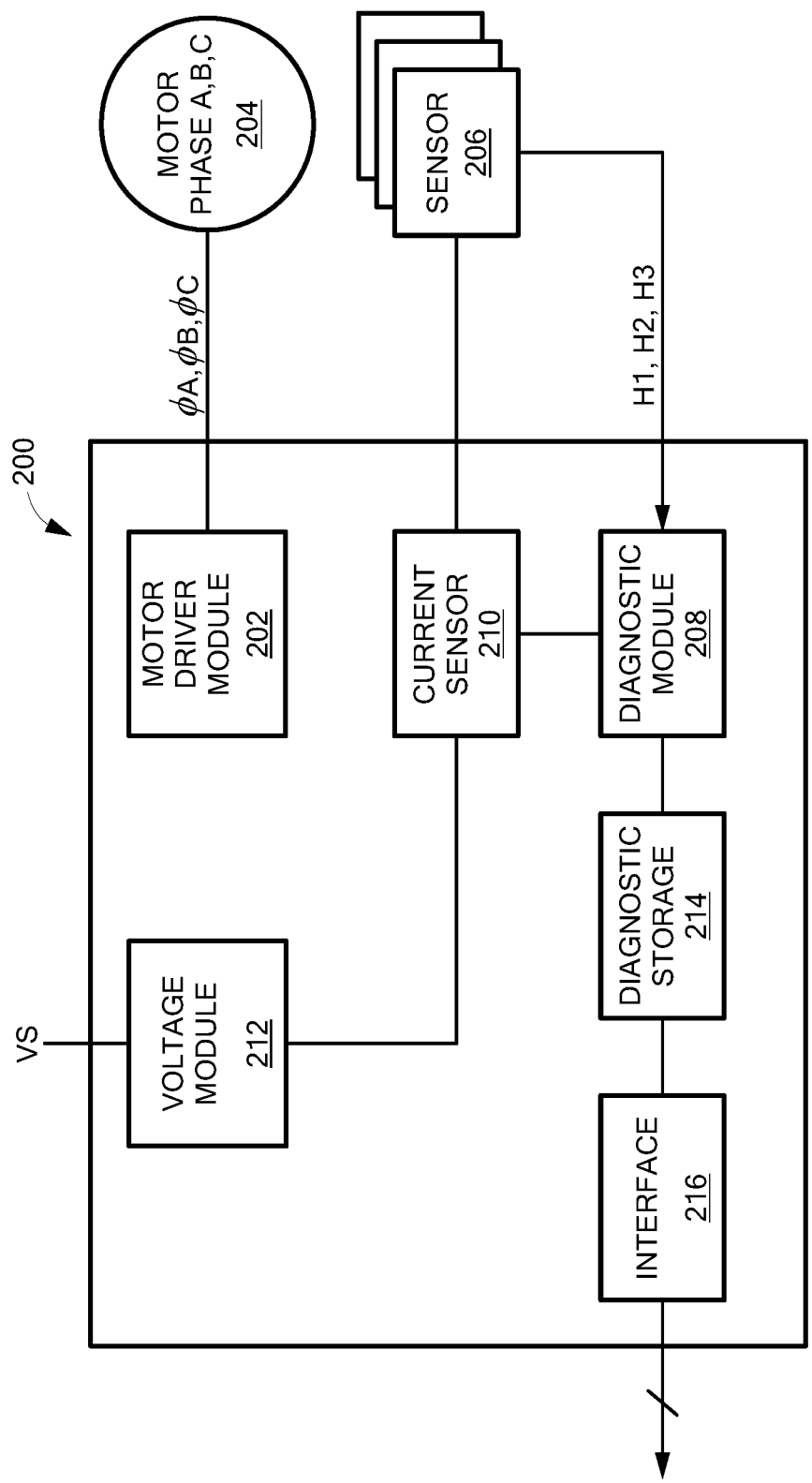
FIG. 2 is a block diagram of an example motor controller having diagnostic signal processing.
Figure 2A:
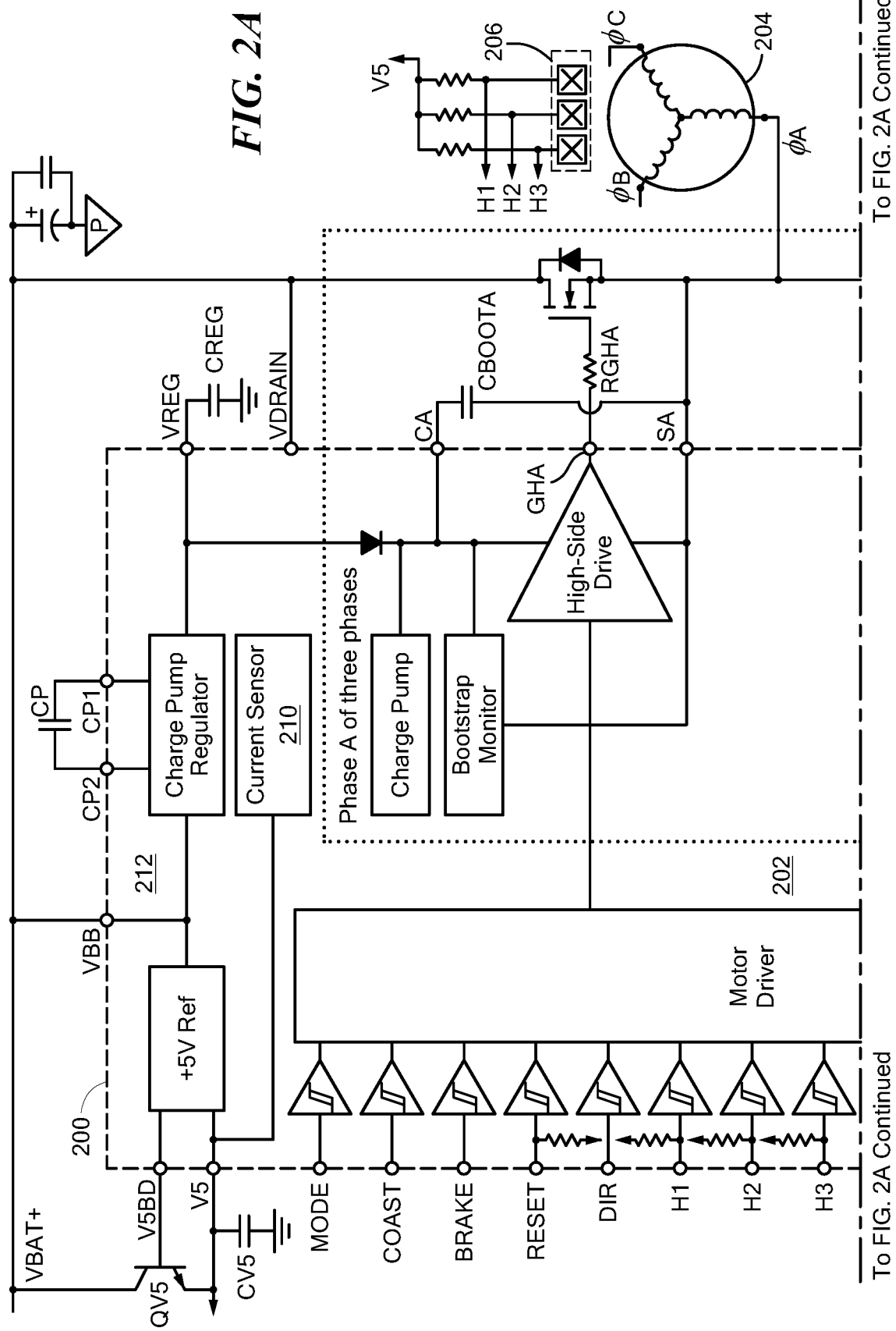
FIG. 2A is an example implementation of the motor controller of FIG. 2.
Figure 2A:
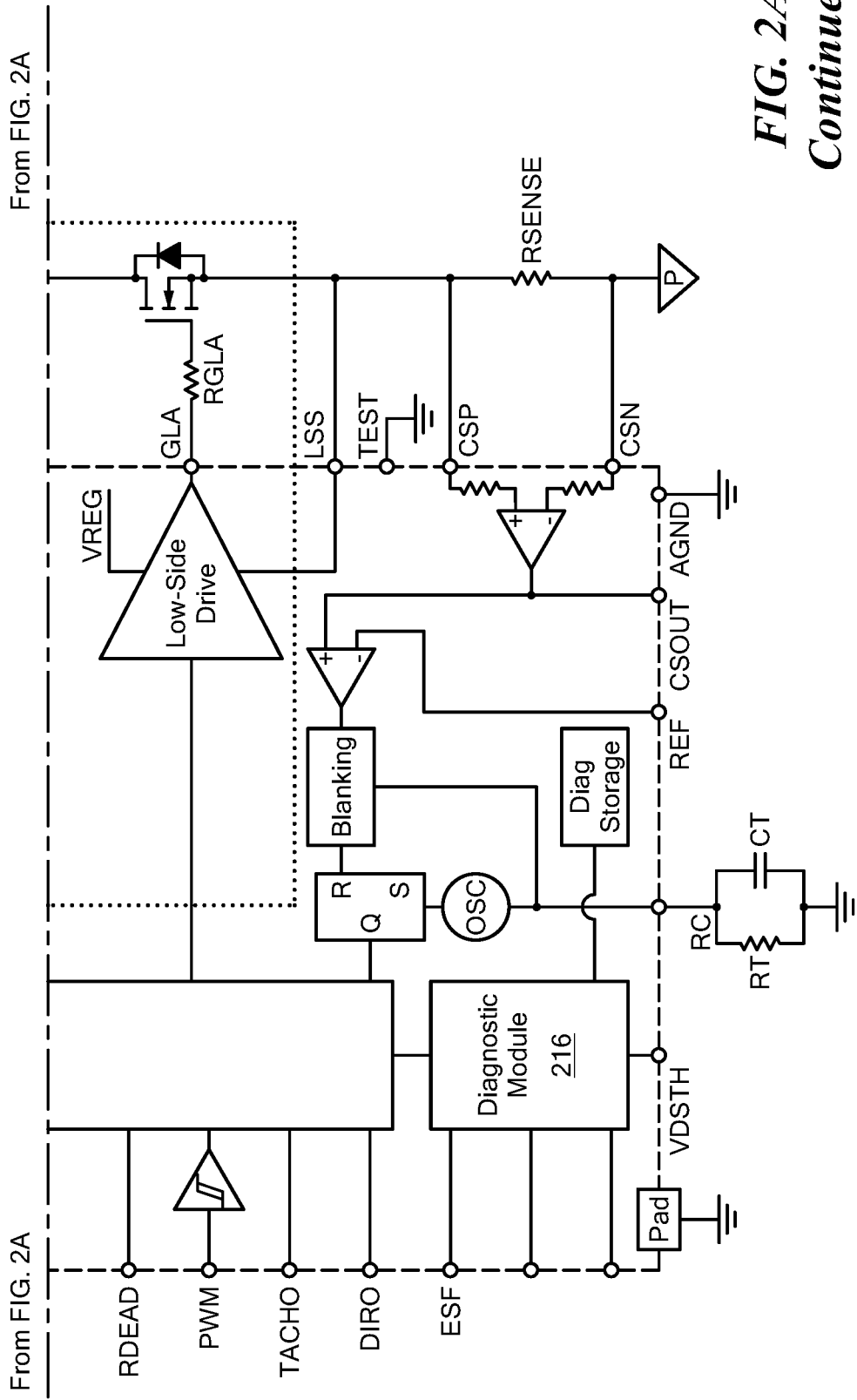

FIG. 2 is a block diagram of an example motor controller 200 having diagnostic signal processing in accordance with example embodiments of the invention. FIG. 2A shows an example implementation of the motor controller of FIG. 2. A motor driver module 202 generates signals to energize each of the phases of a three-phase motor 204, as described above. One or more magnetic field sensors 206, which can be similar to the sensors 105 of FIG. 1, are positioned in relation to respective phases A, B, C of the motor. The magnetic field sensor(s) 206 generate signals for a diagnostic module 208, which may be similar to the diagnostic module 147 of FIG. 1. The diagnostic module 208 can receive and process signals from the sensor 105 to detect faults in the system, as described more fully below.

In embodiments, the motor controller 200 provides a voltage to the energize the sensors 206. A current sensor 210 can be coupled to the voltage supply for the sensors to detect current levels that may indicate a fault or other undesired condition. The current sensor 210 can provide current level information and/or fault alerts to the diagnostic module 208 for processing. In embodiments, a voltage module 212 receives a supply voltage VS, such as from a battery or other energy source, and generates one or more voltage signals for various subsystems that can be monitored by the current sensor 210.

In some embodiments, each of the voltages/current levels to the sensors 206 are monitored individually by the current sensor module 210. In embodiments, the current sensor module 210 and the diagnostic module 208 can determine the presence, or lack thereof, of any one of the sensors 206 for the motor, as well as any open or short conditions of the sensors. For example, a short circuit would cause current levels above a first threshold and an open circuit would cause current levels below a second threshold.

In embodiments, diagnostic storage 214 can provide storage for diagnostic data, as described more fully below. Diagnostic storage 214 can include memory, registers, buffers, flags, and the like. An interface 216 can enable communication to remote devices, computers, networks, and the like. Any suitable interface 216 can be used.

It is understood that any practical number of sensors 206 can be used to monitor operation of the motor 204. In some embodiments, magnetic field sensing elements, such as Hall elements, are integrated with the motor. It is further understood that a given sensor 206 can include any practical number of magnetic field sensing elements in any given configuration and/or orientation to meet the needs of a particular application.

It will be appreciated that any suitable sensor type can be coupled to motor controller embodiments to meet the needs of a particular embodiment. Example sensors include latches having multi-state outputs. Some sensors can be provided as Hall-effect latches with selectable switchpoints.

Figure 3:
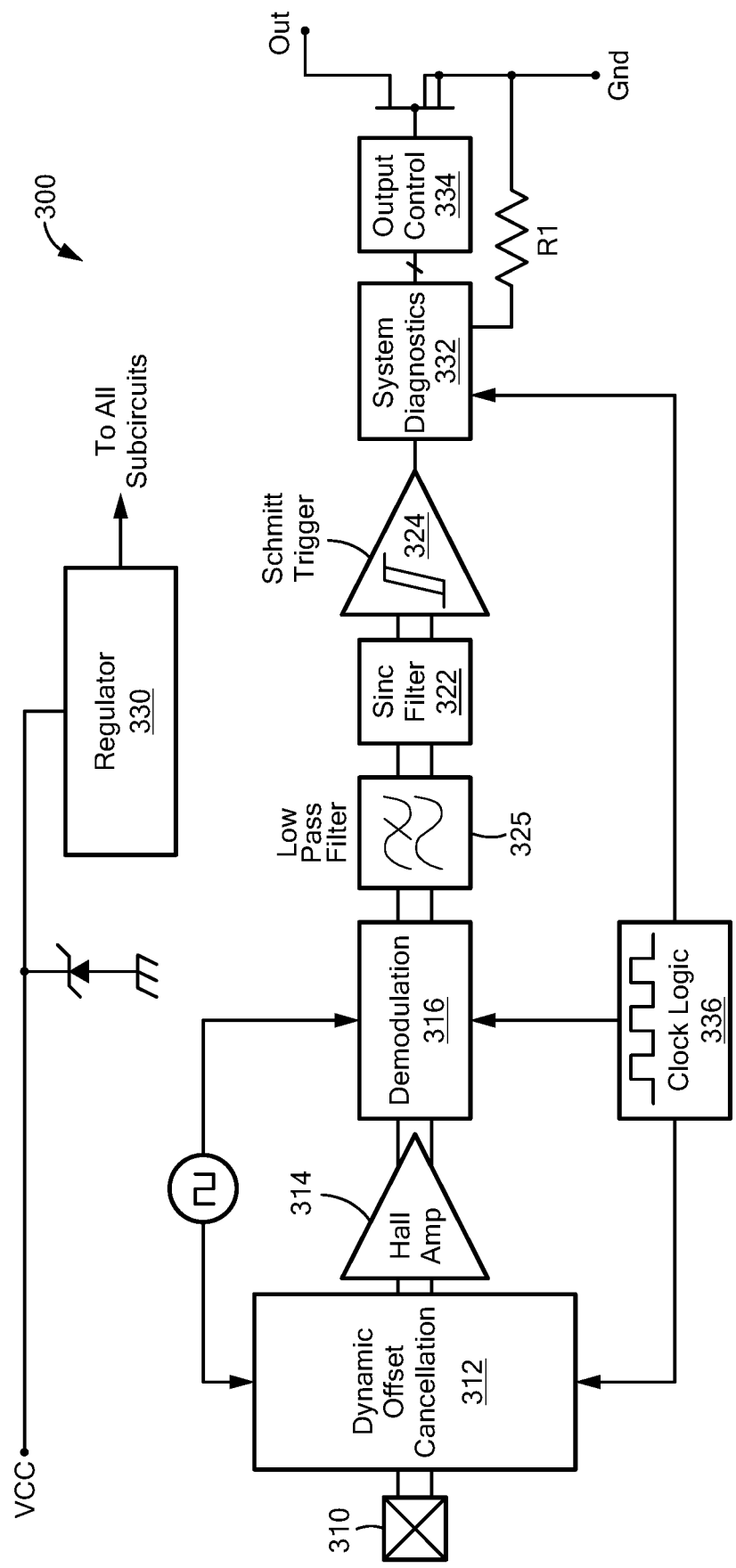
FIG. 3 is a block diagram of a magnetic field sensor.

FIG. 3 shows an example sensor 300 that can provide the sensor 206 of FIG. 2. The magnetic field sensor 300 is shown for an example three-wire magnetic switch or latch. As shown, there are three pins for the sensor 300, including a supply voltage (VCC), a ground (Gnd), and the output of the sensor 300 (Out). In a typical magnetic switch or latch, there are two pins that are used for power (VCC and Gnd), and the third pin (Out) provides the output of the sensor 300. The output (Out) generally has two possible values: (a) high or (b) low, to respectively identify two possible magnetic states of the switch or latch, as either: (a) the magnetic field is above operate point specification for the switch/latch or (b) the magnetic field is below the release point of the specification for the switch/latch, respectively. Conventional three-pin configurations use an open-drain configuration for the output, which gives the user the advantages of setting the high voltage level, known as VPULL. In order to limit the current when the output is on, a resistor ($R_{PULL}$, external to the sensor 300) can be connected between Out and VPULL. The user can also add a capacitor at the output to filter noise, however the external capacitor can limit the output switching speed.

In compliance with certain safety requirements, such as the ASIL (Automotive Safety Integrity Level) requirements, a failure of the sensor is required to be communicated to the user or otherwise output by the sensor 300. However, the open-drain output of conventional three-wire configurations switch between high and low, and do not have a third state that is able to convey the presence of a failure at the output of the sensor. For example, if the output pin is shorted to ground, a conventional open-drain configuration is not able to detect this as a fault, because ground is a normal output state for the sensor. It is desirable to identify such a fault and convey this at the output of a sensor.

The illustrated sensor 300 has a ratiometric output configuration (for example, within the output control block 334) that outputs a first percentage (or ratio) of the supply voltage (VCC) to indicate a logic high, and a second percentage (or ratio) of the supply voltage (VCC) to indicate a logic low, thereby allowing VCC or Gnd to be output to indicate a fault. According to the ratiometric output, a logic high state is indicated by outputting a first percentage of the supply voltage (e.g., 70-90%) and a logic low state is indicated by outputting a second percentage of the supply voltage (e.g., 10-30%). This allows the failure state to be conveyed by outputting the supply voltage (VCC) or ground (Gnd). The ratiometric configuration can be a closed-loop feedback arrangement or at least two switchable elements that provide multiple selectable parallel paths. The closed-loop configuration conveys or otherwise informs a safe state by, for example, turning an output pass element (e.g., a NMOS transistor) off to thereby pull the sensor output to VCC or VPULL or on to thereby pull the sensor output to Gnd in order to convey failures. In normal operation, conduction of the pass element can be controlled to regulate the output voltage at the Out pin to provide the output at the first or second percentages. The selectable parallel paths configuration informs a safe state by turning off the two switchable elements, in which case the output control circuit acts as a conventional open-drain configuration and, in normal operation, the parallel paths are selectively controlled to achieve the output at the first or second percentages.

The magnetic field sensor 300 includes a magnetic field sensing element 310 that generates a magnetic field signal responsive to a magnetic field proximate to the magnetic field sensing element 310. The term "magnetic field sensor" 300 is used to describe a circuit that includes one or more magnetic field sensing elements, generally in combination with other circuits.

The magnetic field signal generated by the magnetic field sensing element 310 is input to a dynamic offset cancellation circuit 312, which is output to an amplifier 314. The amplifier 314 can be a Hall amplifier, for example. The amplifier 314 is coupled to receive the magnetic field signal from the magnetic field sensing element 310 and generate an amplified signal for coupling a demodulation block 316, a low-pass filter 325, and a sinc filter 322. Dynamic offset cancellation circuit 312 may take various forms including chopping circuitry and may function in conjunction with demodulation block 316 to remove offset that can be associated with the magnetic field sensing element 310 and/or the amplifier 314 under the control of signals from clock logic 336. For example, offset cancellation circuit 312 can include switches configurable to drive the magnetic field sensing element (e.g., Hall plate) in two or more different directions such that selected drive and signal contact pairs are interchanged during each phase of the chopping clock signal and offset voltages of the different driving arrangements tend to cancel. The low-pass filter circuit 325 can be designed to remove undesirable spectral components in the resulting signal to generate a filtered signal for coupling to the sinc filter 322. The filter 322 functions to average two or more samples of the magnetic field signal in order to remove any of the filtered Hall Plate offset and front-end amplifier offset, which are at the chopping frequency.

A Schmitt trigger 324 is configured to compare the output of the sinc filter 322 to a reference voltage, or threshold to produce logic high and low values.

The output of the Schmitt trigger 324 is coupled to a system diagnostics controller, or processor 332 that is configured to generate (through output control 334) an output signal of the sensor 300 at output pin Out. As described herein, a conventional three-wire open-drain output configuration that provides a single path for a voltage signal has one of two values (high or low), as shown below in Table 1. The ratiometric configuration (closed-loop feedback configuration or multiple selectable parallel path configuration) allows for the logic high level and the logic low level to be represented as, respectively, X % and Y % of the supply voltage, and the safe state can thus be conveyed as either the supply voltage itself or Gnd as is also shown in Table 1. It will be appreciated that "X" and "Y" are variables indicative of a percentage of the supply voltage and can be any number between 0 and 100.

TABLE 1

|  | Standard Output Voltage | New Output Voltage |
| --- | --- | --- |
| High State | VPull | X % of VPULL |
| Low State | <Vsat | Y % of VPULL |
| Safe State | — | VPULL or GND |

The system diagnostics 332 receives the output of the Schmitt trigger circuit 324 and can be configured to perform various diagnostics to detect faults. Accordingly, the output of the system diagnostics 332, and thus the input signal to the output control block 334, can include the output of the Schmitt trigger that can be a logic high or a logic low and can also include a fault signal to indicate a fault.

As used herein the term "supply voltage" (of which the ratiometric output one of two percentages X % or Y %) refers generally to pull up voltage VPULL. Although a user generally has the flexibility to set the pull up voltage VPULL to the same voltage as the supply voltage level VCC or to a different voltage level, in the feedback configuration embodiments described herein, the VPULL voltage must be set to the supply voltage level VCC in order to achieve output levels ratiometric with VPULL.

In accordance with the ratiometric configuration, rather than providing either a high or low output, two different percentages (or two different ranges of percentages) of VCC or VPULL can be used to represent the logic high and logic low values, so that VCC, VPULL, or GND can be output to indicate a fault. The output of the Schmitt trigger circuit 324 controls the switch element(s) of the output control circuit 334 to provide the X %, Y %, and GND. The output signal is provided as X % or Y %, and in some embodiments is driven to something other than X % or Y % (e.g., VCC or GND) to indicate a fault.

Table 2 below illustrates the output relative to the fault condition for the various output states and output levels used to indicate a fault. The output state corresponds to the Schmitt output (e.g., the output of Schmitt trigger 324) and the output level corresponds to the output of the output control circuit 334 at the sensor output pin (e.g., Out shown in FIG. 3 and/or VOUT). As shown in Table 2, when there is no fault, the output state (e.g., Schmitt trigger 324) switches between $V_{OUT(LOW)}$ and $V_{OUT(HIGH)}$ and the corresponding output level (e.g., of the output control circuit 334) is, respectively, 20% or 80% of VPULL (or $V_{PU}$). This allows various other faults to be conveyed at the output of the sensor. A short-circuit fault of VCC-VOUT is not capable of conveying this output state during normal switching at the Schmitt trigger output, however it can be conveyed as VCC output level. A short-circuit fault VOUT-GND likewise is not capable of conveying this output state during normal switching at the Schmitt trigger output, however it can be conveyed as GND at the output level. A short-circuit fault of VCC-GND is also not capable of conveying this output state during normal switching at the Schmitt trigger output, however it can be conveyed as VCC at the output level. An open-circuit fault at VCC is not capable of conveying this output state during normal switching at the Schmitt trigger output, however it can be conveyed as VPU at the output level. An open-circuit fault at VOUT corresponds to normal switching between $V_{OUT(LOW)}$ and $V_{OUT(HIGH)}$ and the corresponding output level conveyed to the sensor is VPU. An open-circuit fault at GND does not have a corresponding output state at the Schmitt trigger output, however the output level is VPU as shown in Table 2. An internal fault results in an output state of $V_{OUT(FAULT)}$, which can correspond to VPU for the output level of the output control circuit. Accordingly, the various fault conditions can be conveyed at the sensor output, while allowing normal switching when no fault is detected.

TABLE 2

Fault Conditions and Resulting Output Level.

| Fault | Output State | Output Level |
|---|---|---|
| No Fault | Normal Switching between $V_{OUT(LOW)}$ and $V_{OUT(HIGH)}$ | 20% or 80% of $V_{PU}$, respectively |
| Short, VCC-VOUT | n/a | $V_{CC}$ |
| Short, VOUT-GND | n/a | GND |
| Short, VCC-GND | n/a | $V_{CC}$ |
| Open, VCC | n/a | $V_{PU}$ |
| Open, VOUT | Normal Switching between $V_{OUT(LOW)}$ and $V_{OUT(HIGH)}$ | $V_{PU}$ |
| Open, GND | n/a | $V_{PU}$ |
| Internal Fault | $V_{OUT(FAULT)}$ | $V_{PU}$ |

Note:
$V_{OUT(FAULT)} = V_{PULL-UP}$ and $V_{PULL-UP} = V_{CC}$

Figure 4A:
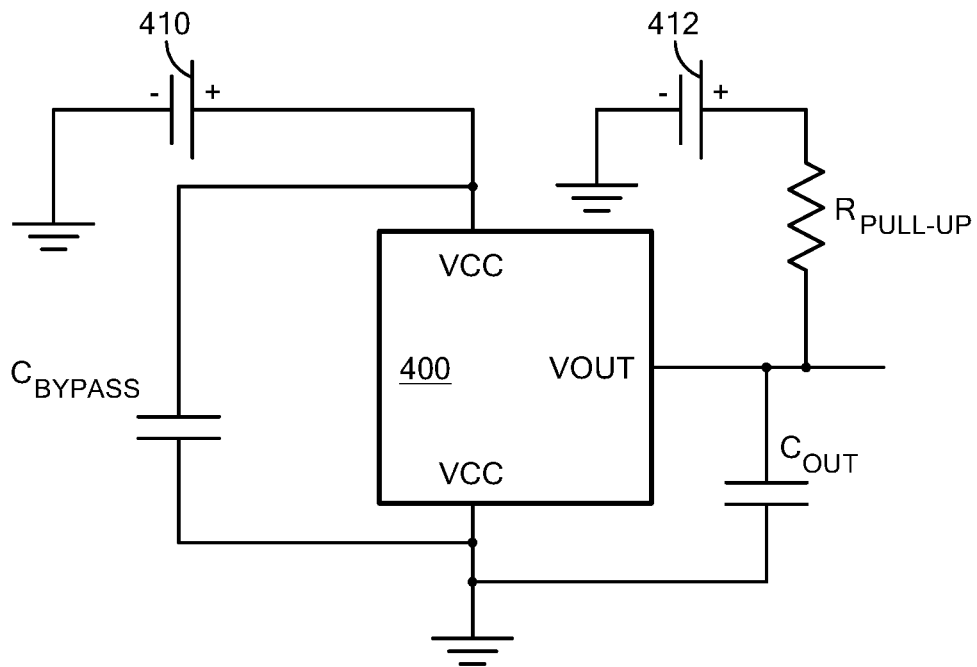
FIG. 4A is a block diagram showing an example three-pin configuration for a sensor according to FIG. 3.
Figure 4B:
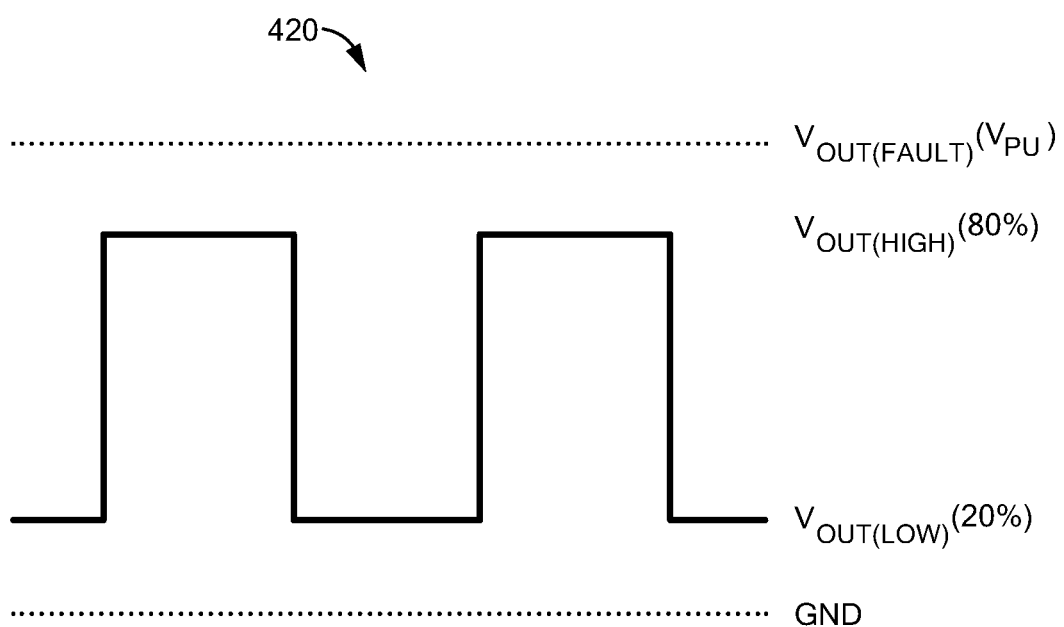
FIG. 4B is a graphical diagram showing an output of an example sensor.

FIG. 4A is a block diagram showing an example three-pin configuration for sensor 300 of FIG. 3. The example three-pin configuration includes the supply voltage (VCC), the output (VOUT), and ground (GND). The output VOUT is regulated by an output control circuit to output a first percentage (X %) in response to a logic high value and to a second percentage (Y %) in response to a logic low value. FIG. 4B is a graphical diagram showing an example ratiometric output of the sensor. As shown, in graph 420, during normal operation the output switches between $V_{OUT(HIGH)}$ (X % of the supply voltage) and $V_{OUT(LOW)}$ (Y % of the supply voltage). The output can be provided at a different level such as $V_{OUT(FAULT)}$ or GND when a fault occurs. It will be appreciated that the voltage level of VCC 410 and the pull up voltage VPULL 412 may or may not be the same, although VPULL and VCC must be the same in the feedback configuration embodiments described below.

Figure 5:
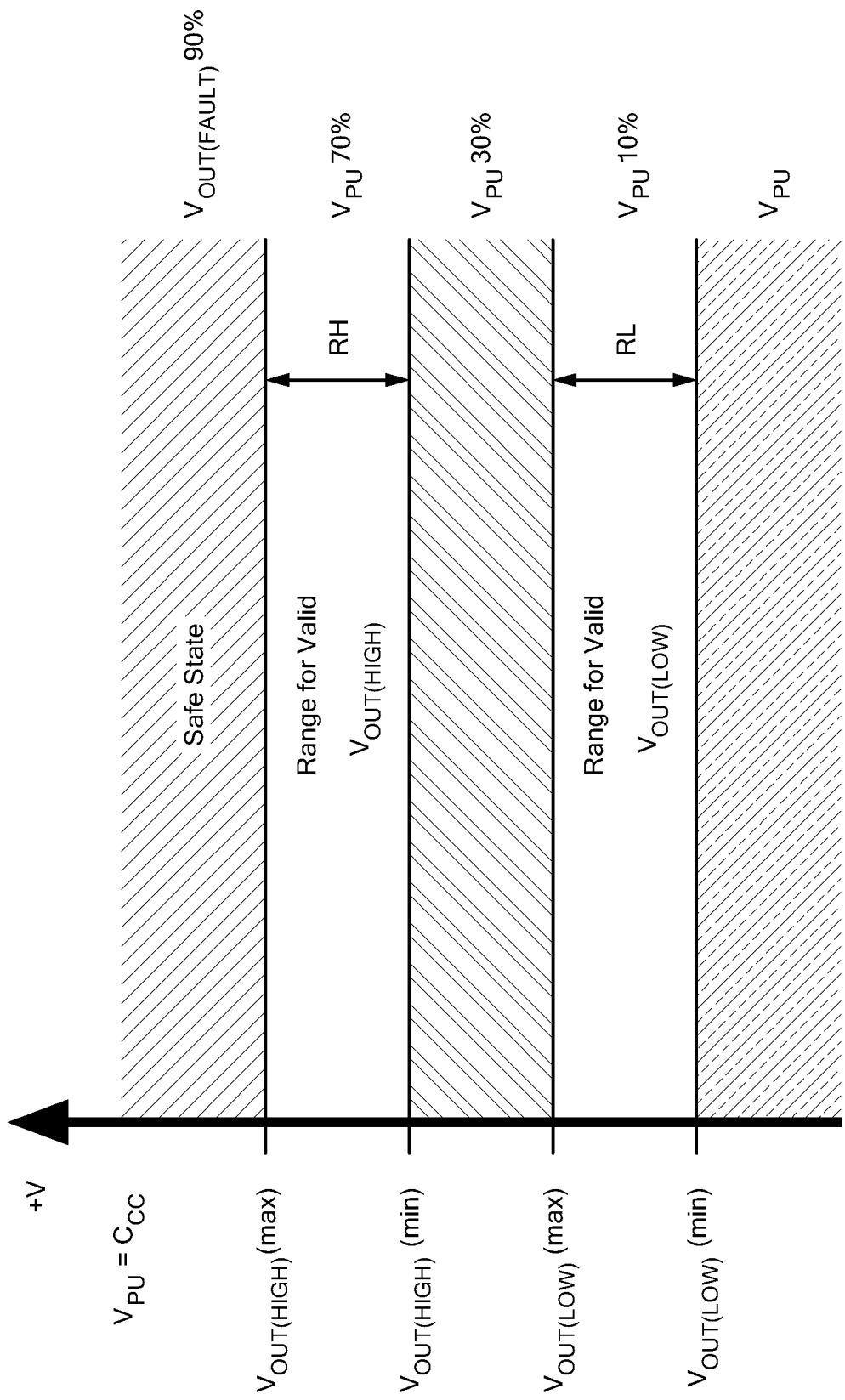
FIG. 5 is a graphical diagram showing $V_{OUT(HIGH)}$, $V_{OUT(LOW)}$, and $V_{OUT(FAULT)}$ values for an example sensor.

FIG. 5 is a graphical diagram showing example $V_{OUT(HIGH)}$, $V_{OUT(LOW)}$, and $V_{OUT(FAULT)}$ values, in which X % and Y % can be expressed as a range, for example 70-90% for high and 10-30% for low. As such, any output that does not fall within the high range or the low range can be considered a fault. As shown, the range for $V_{OUT(HIGH)}$ is 70-90% of the supply voltage and the range for $V_{OUT(LOW)}$ is 10-30% of the supply voltage. Thus, an output that is 70-90% of VPULL indicates a logic high value, and an output that is 10-30% of VPULL indicates a logic low value. It is possible to convey a fault by outputting any voltage that does not fall within one of the ranges for a logic high or for a logic low. In some embodiments, a specific fault can be indicated by driving the output to either $V_{CC}$ or GND. It should be apparent that the ranges of 10-30% for the low value and 70-90% for the high value are only example numbers, and any value could be used having any range, so long as the ranges are not overlapping in order to thereby permit a logic high condition to be distinguished from a logic low condition. For example, the low value could be 15-40% and the high value could be 60-95%, so long as one range is provided for the low value and another range is provided for the high value, and they do not overlap with each other.

Figure 6:
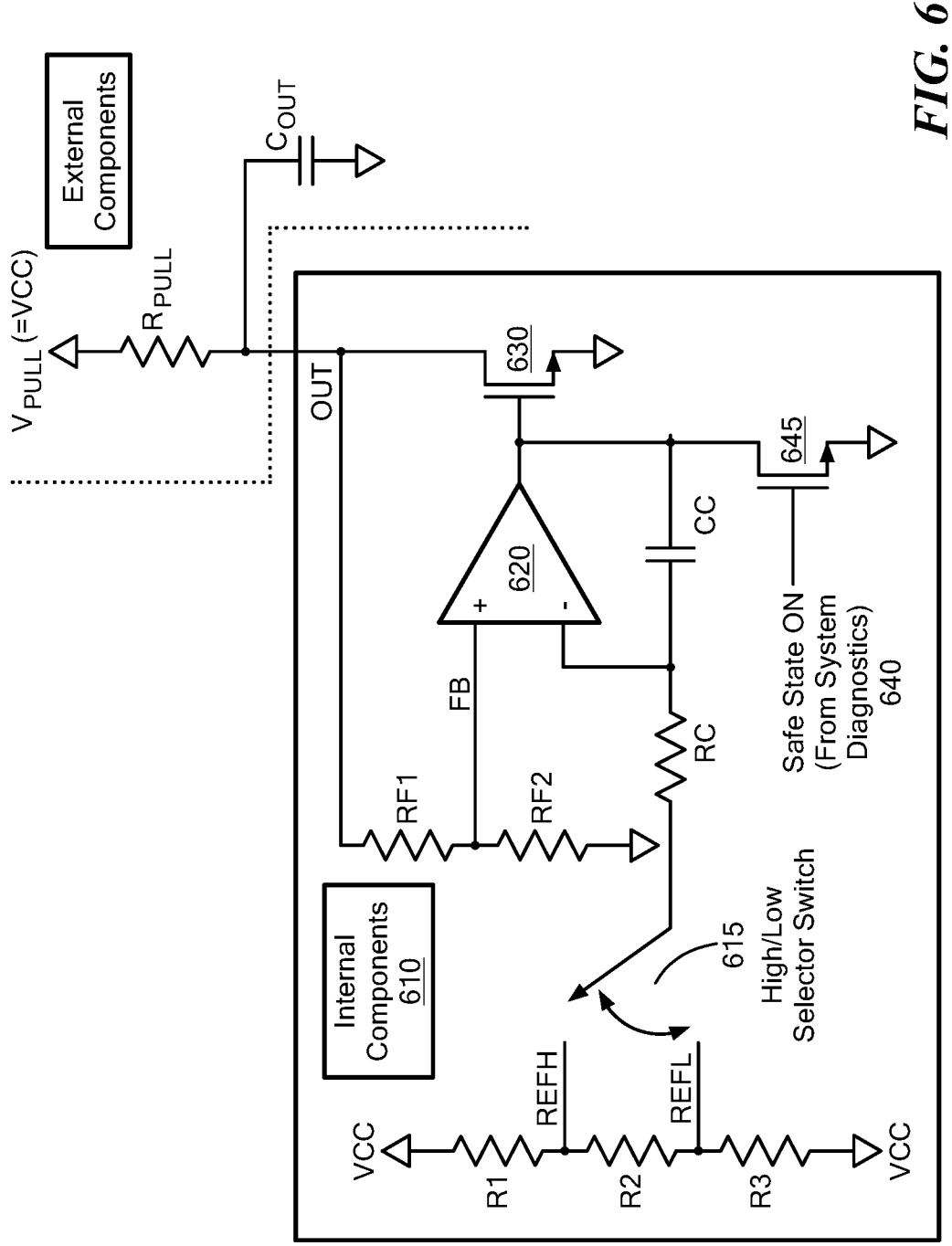
FIG. 6 is a block diagram showing an example configuration of a circuit for generating a sensor output signal including a pass element and an operational amplifier in a closed-loop feedback configuration, according to an embodiment of the present disclosure.

FIG. 6 is a block diagram showing an example ratiometric configuration of a sensor output circuit in greater detail including a pass element and an operational amplifier in a closed-loop feedback configuration. FIG. 6 shows an example sensor output circuit 610 which, for example, can reside within the output control block 334 shown in FIG. 3.

Also shown in FIG. 6 are components external to the sensor including pull-up resistor RPULL and filter capacitor COUT. The circuit 610 has a closed-loop configuration and includes a resistor divider comprising resistors RF1 and RF2 that sense the output voltage on the OUT pin. The output is fed back into one input of the operational amplifier 620 to provide a feedback signal FB. The feedback signal FB is compared to a reference voltage (fed into the other input of the operational amplifier 620) that is taken from VCC, in which two possible references can be selected.

The reference voltage is generated by a resistor divider (including resistors R1, R2, and R3) coupled to supply voltage VCC and selectively coupled to the operational amplifier 620 by a switch 615. A first reference voltage REFH is selected by the switch 615 to set the high state, which can be X % of the supply voltage (VPULL), and a second reference voltage REFL is selected by the switch 615 to set the low state, which can be Y % of the supply voltage (VPULL) as shown in Table 1 above. The switch 615 can be controlled by the signal output by the Schmitt trigger (e.g., Schmitt trigger 324 in FIG. 3). When the output of the Schmitt trigger (i.e., the input signal to the output control block 334) is a logic high, the switch selects the high reference voltage REFH, and when the input signal is a logic low, the switch selects the low reference voltage REFL.

The comparison of the feedback signal (FB) to the high reference voltage REFH or the low reference voltage REFL is performed by the operational amplifier 620. The resulting difference signal generated by the operational amplifier 620 controls conduction of the pass element 630 (e.g., NMOS transistor) to output the selected percentage of the supply voltage.

In embodiments, a switch 645 as may take the form of a field-effect-transistor (FET) can be coupled to the gate of pass element 630 to turn the pass element 630 off when a fault is detected (e.g., by diagnostics controller 332). In particular, when a fault is detected, switch 645 can be turned on to thereby pull the gate of pass element 630 low, and turn off pass element 630 to allow the output circuit 610 to act as a conventional open-drain configuration to convey a safe state or fault by pulling the output to VPULL or VCC through RPULL. Whereas, when no fault is detected, switch 645 can be off and thereby not interfere with the ratiometric control of pass element 630 by operational amplifier 620. It will be appreciated that by design of the signal level of fault signal 640 and device type of switch 645, when a fault is detected, switch 645 may alternatively cause pass element 630 to turn on and thereby pull the sensor output to GND to thereby indicate the fault.

In order to stabilize the feedback system, compensation components as may include a compensation resistor (RC) and a compensation capacitor (CC) can be provided. These compensation components add a pole at the 0 Hz (integrator) and a zero at $1/(2\pi*RC*CC)$. The compensation resistor (RC) must be significantly greater than the sum of R2 and R3 (RC>>R2+R3). The compensation components have high open-loop gain at low frequencies to reduce the regulation error, and at high frequencies the open-loop gain drops until the zero comes in, leaving the output pole to continue the gain dropping until the 0 dB line is crossed. If the output pole is equal to or greater than zero, the phase margin is sufficient to have the systems table. If no external capacitor COUT is used, the pole at the NMOS gate limits the bandwidth before another internal pole comes in. As such, there is no requirement for an external capacitor (COUT) that is typically required with an open-loop configuration. By stabilizing internally, the external capacitor COUT is not needed. The configuration also allows for a conventional open drain output to be realized by turning off the pass element 630, thereby allowing both types of outputs on a single die.

Figure 7:
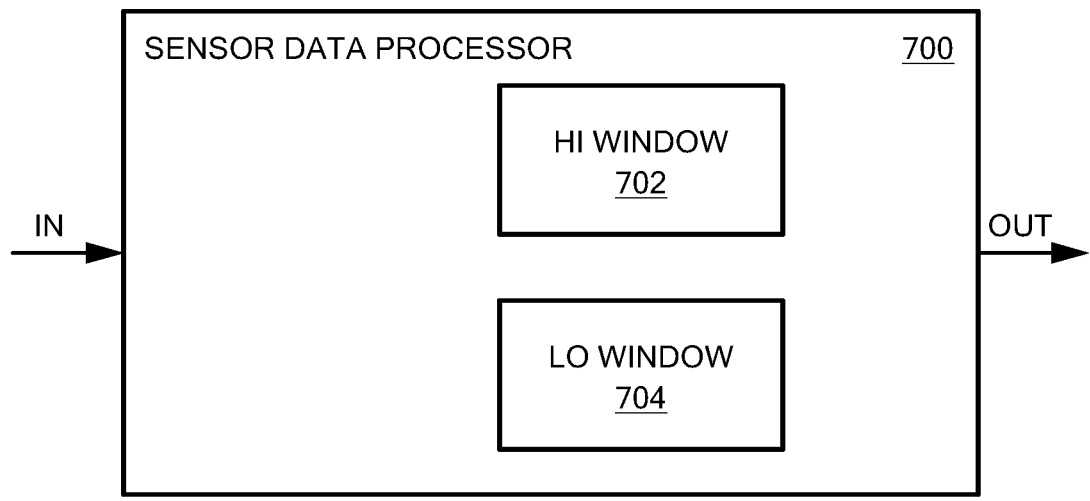
FIG. 7 is a block diagram of a sensor data processing module to process signals from a magnetic field sensor.

FIG. 7 shows an example sensor data processor 700 that can process sensor signals, such as the signal defined by FIG. 5, from one or more sensors and generate an output signal. As described above in FIG. 5, $V_{OUT(HIGH)}$, $V_{OUT(LOW)}$, and $V_{OUT(FAULT)}$ values, in which X % and Y % can be expressed as a range, for example 70-90% for high and 10-30% for low, with respect to a supply voltage. As such, any output that does not fall within the high range or the low range can be considered a fault. In the example sensor data processor 700, which can form a part of the diagnostic module 208 of FIG. 2, for example, includes a hi window module 702 and a lo window module 704. The hi window module 702 receives a sensor signal and determines whether the sensor signal is within the defined range for a high signal, e.g., 70-90% of a supply voltage. The low window module 704 receives the sensor signal and determines whether the sensor signal is within the defined range for a low signal, e.g., 10-30% of a supply voltage. If the sensor signal is within the high signal range or the low signal range, the sensor data processor 700 determines that the sensor signal has valid data. If the sensor signal is determined to be outside the valid high or low ranges, then the sensor data module 700 can output a signal having a state indicative of a fault.

Figure 7A:
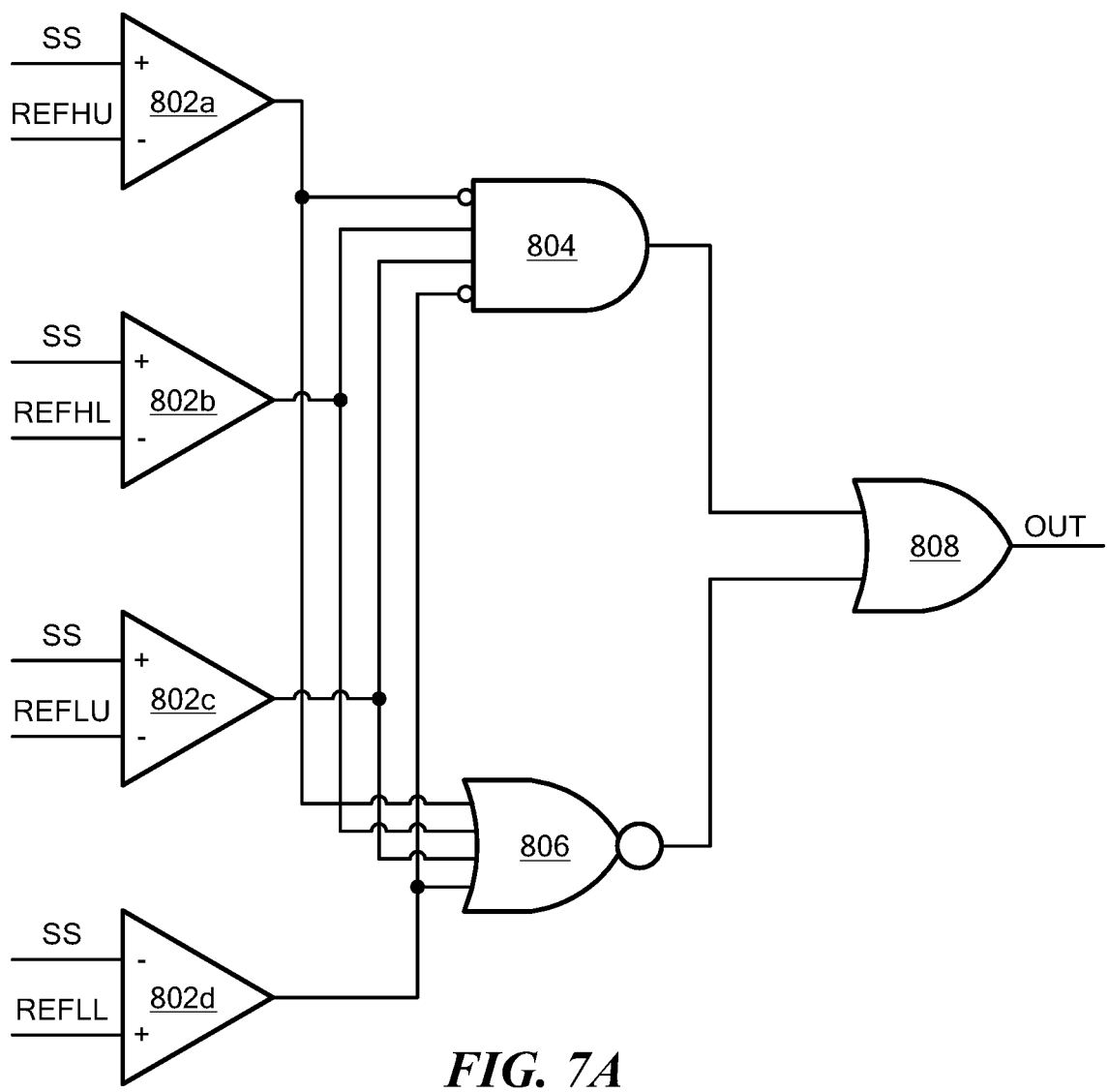
FIG. 7A is a circuit diagram of an example implementation to process signals from a magnetic field sensor.

FIG. 7A shows an example circuit implementation of a sensor data processing module. An input signal SS from a sensor can be provided to a series of comparators 802a,b,c,d. The first comparator compares the sensor signal SS to a reference voltage level REF_HU corresponding to the upper level of a valid range for a high signal from the sensor, e.g., $V_{OUT(HIGH)}$(max) in FIG. 5. If the sensor signal SS is less than the reference voltage level REF_HU, then the comparator 802a outputs a logic '0' and a '1' otherwise. The second comparator 802b compares the sensor signal SS to a reference voltage level REF_HL corresponding to a lower level of the valid range for a high signal, e.g., $V_{OUT(HIGH)}$(min) in FIG. 5. If the sensor signal SS is greater than the reference voltage level REF_HL then the second comparator 802b outputs a '1' and a '0' otherwise. Thus, if the sensor signal SS is a valid high signal, the first comparator 802a outputs a '0' and the second comparator 802b outputs a '1'.

The third comparator 802c compares the sensor signal SS to a reference voltage level REF LU corresponding to the upper level of a valid range for a low signal from the sensor, e.g., $V_{OUT(LOW)}$(max) in FIG. 5. If the sensor signal SS is less than the reference voltage level REF LU, then the third comparator 802c outputs a logic '0' and a '1' otherwise.

The fourth comparator 802d compares the sensor signal SS to a reference voltage level REF LL corresponding to a lower level of the valid range for a low signal, e.g., $V_{OUT(LOW)}$(min) in FIG. 5. If the sensor signal SS is less than the reference voltage level REF_HL then the second comparator 802b outputs a '0' and a '1' otherwise. Thus, if the sensor signal SS is a valid LO, the third comparator 802c outputs a '0' and the fourth comparator 802d outputs a '0'.

In the illustrated embodiment, the outputs of the comparators 802a-d are inputs for an AND gate 804 with outputs of the first and fourth comparators 802a,d inverted. The comparator 802a-d outputs are also inputs to a NOR gate 806. If there is a valid high sensor signal SS, e.g., within a valid range, the outputs from the comparators 802a, 802b, 802c, 802d are (0, 1, 1, 0) and if there is a valid low sensor signal SS, the outputs from the comparators 802a, 802b, 802c, 802d are (0, 0, 0, 0). The AND gate 804 outputs a '1' when the comparator 802a, 802b, 802c, 802d outputs are (0, 1, 1, 0), which corresponds to a valid high sensor signal SS and the NOR gate 806 output is a '1' when the sensor signal SS is a valid low signal. In an example embodiment, the outputs of the AND gate 804 and the NOR gate 806 are inputs to an OR gate 808. If a valid high or low sensor signal is received, either the AND gate 804 or the NOR gate 806 outputs a '1' so that the output signal of the OR gate 808 is active. If an invalid sensor signal SS is received, e.g., not a valid high or valid low signal, the output signal is not a '1.'

In other embodiments, additional logic can identify certain states corresponding to various sensor signals. For example, a safe state, which may correspond to comparator 802a, 802b, 802c, 802d outputs (1, 1, 1, 0), can be detected. It is understood a wide variety of circuit implementations are possible to detect valid and/or invalid sensor signals to meet the needs of a particular application.

While illustrative embodiments of the invention are shown and described in conjunction with a magnetic field sensing element comprising a Hall element, it is understood that any suitable type of magnetic field sensing element can be used.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Figure 8:
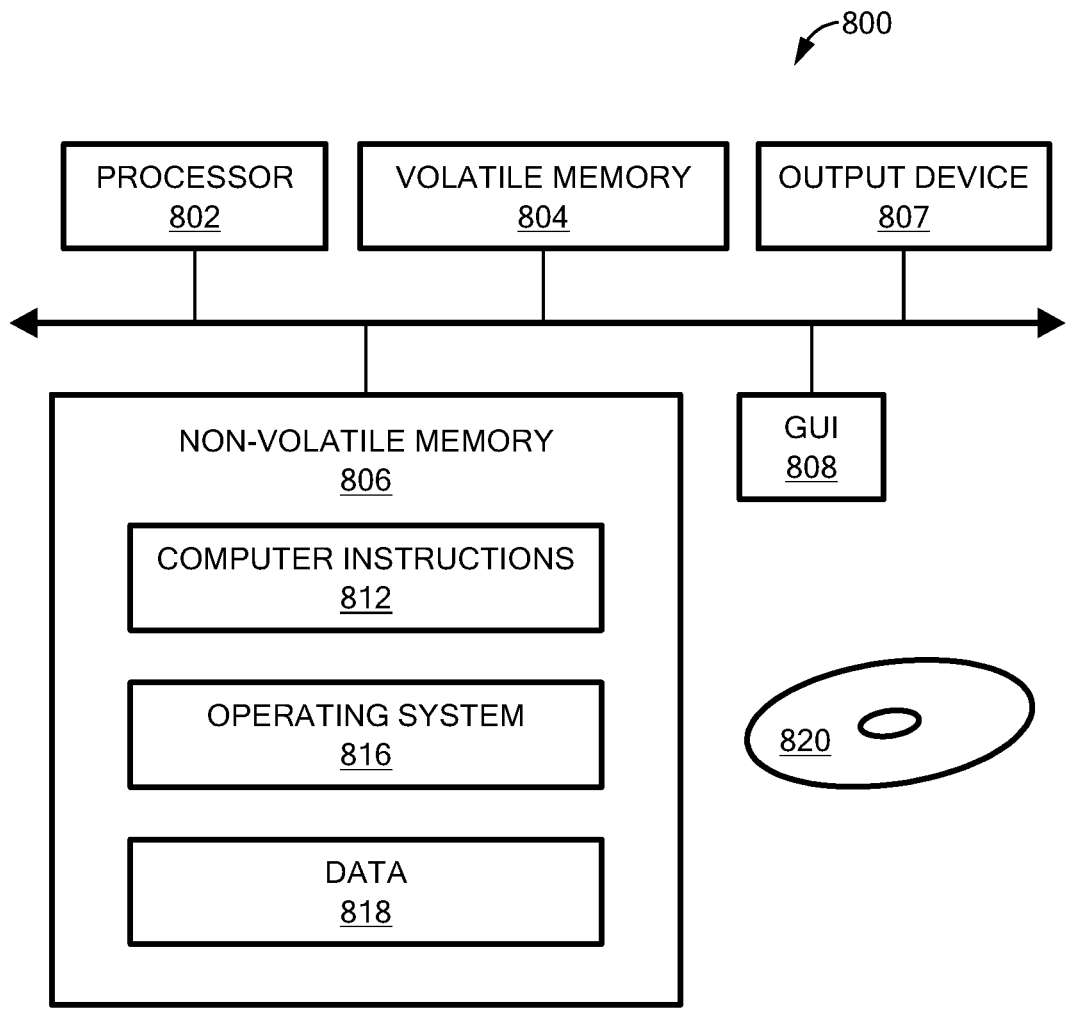
FIG. 8 is a schematic representation of an illustrative computer that can perform at least a portion of the processing described herein.

FIG. 8 shows an exemplary computer 800 that can perform at least part of the processing described herein. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
    receiving, at a motor controller/driver, a signal from a magnetic field sensor positioned in relation to a motor, wherein the signal has a first voltage range corresponding to a valid high state and a second voltage range corresponding to a valid low state;
    processing the received signal from the magnetic field sensor to determine whether the received signal has a voltage level within the first or second voltage ranges;
    generating an output signal having a state based on the whether the received signal has a voltage level within the first or second voltage ranges.

2. The method according to claim 1, further including processing the received signal from the magnetic field sensor to determine whether the received signal has a voltage level corresponding to a safe state.

3. The method according to claim 2, wherein the voltage level corresponding to a safe state is a voltage level above the first voltage range.

4. The method according to claim 1, wherein first voltage range corresponds to percentages of a supply voltage.

5. The method according to claim 1, wherein the magnetic field sensor comprises at least one magnetic field sensing element.

6. The method according to claim 1, wherein the magnetic field sensor comprises a Hall effect latch.

7. The method according to claim 1, further including measuring current draw by the magnetic field sensor.

8. The method according to claim 7, further including identifying open and/or short circuits of the magnetic field sensor based on the current draw.

9. The method according to claim 1, further including connecting the output signal to a remote controller for alerting the system of faults associated with the magnetic field sensor.

10. The method according to claim 9, further including receiving and processing signals from further magnetic field sensors positioned in relation to the motor.

11. A motor controller/driver integrated circuit package, comprising:
    an input to receive a signal from a magnetic field sensor positioned in relation to a motor, wherein the signal has a first voltage range corresponding to a valid high state and a second voltage range corresponding to a valid low state;
    a diagnostic module configured to process the received signal from the magnetic field sensor to determine whether the received signal has a voltage level within the first or second voltage ranges; and
    an output module to generate an output signal having a state based on the whether the received signal has a voltage level within the first or second voltage ranges.

12. The motor controller/driver integrated circuit package according to claim 11, wherein the diagnostic module is further configured to process the received signal from the magnetic field sensor to determine whether the received signal has a voltage level corresponding to a safe state.

13. The motor controller/driver integrated circuit package according to claim 12, wherein the voltage level corresponding to a safe state is a voltage level above the first voltage range.

14. The motor controller/driver integrated circuit package according to claim 11, wherein first voltage range corresponds to percentages of a supply voltage.

15. The motor controller/driver integrated circuit package according to claim 11, wherein the magnetic field sensor comprises at least one magnetic field sensing element.

16. The motor controller/driver integrated circuit package according to claim 11, wherein the magnetic field sensor comprises a Hall effect latch.

17. The motor controller/driver integrated circuit package according to claim 11, wherein the diagnostic module is further configured to measure current draw by the magnetic field sensor.

18. The method according to claim 17, wherein the diagnostic module is further configured to identify open and/or short circuits of the magnetic field sensor based on the current draw.

19. The motor controller/driver integrated circuit package according to claim 11, wherein the motor controller/driver integrated circuit package is connected to a remote controller for alerting the system of faults associated with the magnetic field sensor.

20. The motor controller/driver integrated circuit package according to claim 11, wherein the diagnostic module is further configured to receive and process signals from further magnetic field sensors positioned in relation to the motor.

* * * * *